(12) United States Patent
Smitt et al.

(10) Patent No.: US 8,263,957 B2
(45) Date of Patent: Sep. 11, 2012

(54) APPARATUS FOR ACQUIRING DIGITAL X-RAY IMAGE

(75) Inventors: Asbjorn Smitt, Tradewinds (GI); Sung-Woon Lee, Daejeon (KR); Jin-Yong Kim, Daejeon (KR); Ji-Hyun Yi, Daejeon (KR)

(73) Assignee: 3D Imaging & Simulations Corp., Daejeon (KR)

( * ) Notice: Subject to any disclaimer, the term of this patent is extended or adjusted under 35 U.S.C. 154(b) by 735 days.

(21) Appl. No.: 12/481,379

(22) Filed: Jun. 9, 2009

(65) Prior Publication Data

US 2010/0252756 A1 Oct. 7, 2010

(30) Foreign Application Priority Data

Apr. 1, 2009 (KR) ........................ 10-2009-0028265

(51) Int. Cl.
G03B 42/08 (2006.01)
(52) U.S. Cl. ......... 250/584; 250/580; 250/582; 250/591
(58) Field of Classification Search .................. 250/582, 250/591
See application file for complete search history.

(56) References Cited

U.S. PATENT DOCUMENTS

| | | | | |
|---|---|---|---|---|
| 5,376,806 A * | 12/1994 | Hejazi | ........................... | 250/584 |
| 5,578,824 A * | 11/1996 | Koguchi et al. | ............... | 250/318 |
| 5,990,487 A * | 11/1999 | Ngo | ............................. | 250/589 |
| 6,410,933 B1 * | 6/2002 | Hall et al. | ..................... | 250/589 |
| 6,528,811 B1 * | 3/2003 | Arakawa | ........................ | 250/586 |
| 6,555,838 B1 * | 4/2003 | Livingston et al. | ........... | 250/585 |
| 6,878,928 B2 * | 4/2005 | Karasawa | ....................... | 250/235 |
| 7,247,858 B2 * | 7/2007 | De Keyser | ............... | 250/370.09 |
| 7,315,040 B2 * | 1/2008 | Auer et al. | ..................... | 250/589 |
| 7,397,059 B2 * | 7/2008 | Ishisaka | ........................ | 250/586 |
| 7,777,192 B2 * | 8/2010 | Ohta et al. | ............... | 250/370.09 |
| 2002/0053650 A1 * | 5/2002 | Iwakiri | ........................ | 250/588 |
| 2002/0060303 A1 * | 5/2002 | Yonekawa | ....................... | 250/589 |
| 2004/0094730 A1 * | 5/2004 | Imai et al. | ..................... | 250/584 |
| 2004/0164257 A1 * | 8/2004 | Sayag | ........................... | 250/584 |
| 2004/0200971 A1 * | 10/2004 | De Keyser | ............... | 250/370.09 |
| 2006/0054846 A1 * | 3/2006 | Satoh et al. | ..................... | 250/587 |
| 2006/0081796 A1 * | 4/2006 | Umemura | ....................... | 250/589 |
| 2006/0097177 A1 * | 5/2006 | Yamamoto | ............... | 250/370.08 |
| 2008/0258087 A1 * | 10/2008 | Alzner et al. | ................. | 250/584 |
| 2008/0265187 A1 * | 10/2008 | Boutet et al. | .................. | 250/585 |
| 2009/0190932 A1 * | 7/2009 | Nishino et al. | ................. | 398/140 |
| 2011/0001052 A1 * | 1/2011 | Struye | ........................... | 250/369 |

FOREIGN PATENT DOCUMENTS

KR 10-2008-0026338 A 3/2008

OTHER PUBLICATIONS

Korean Patent Abstracts of the Korean Intellectual Property Office (KIPO) English translation of the Abstract for Korean Publication No. 10-2008-0026338, published Mar. 25, 2008 (1 page).

* cited by examiner

*Primary Examiner* — David Porta
*Assistant Examiner* — Djura Malevic
(74) *Attorney, Agent, or Firm* — Osha Liang LLP

(57) ABSTRACT

Provided is an apparatus for acquiring a digital X-ray image that radiates X-ray on a patient's part by using a high sensitivity imaging plate (IP), reads the radiated patient's part, acquires a signal including patient information and image information regarding a patient, converts the signal into a digital signal, and links the digital signal to external equipment.

11 Claims, 9 Drawing Sheets

APPARATUS FOR ACQUIRING DIGITAL X-RAY IMAGE

CROSS-REFERENCE TO RELATED PATENT APPLICATION

This application claims the benefit of Korean Patent Application No. 10-2009-0028265, filed on Apr. 1, 2009, in the Korean Intellectual Property Office, the disclosure of which is incorporated herein in its entirety by reference.

BACKGROUND OF THE INVENTION

1. Field of the Invention

The present invention relates to an apparatus for acquiring a digital X-ray image, and more particularly to, an apparatus for acquiring a digital X-ray image that radiates X-ray on a patient's part by using a high sensitivity imaging plate (IP), reads the radiated patient's part, acquires a signal including patient information and image information regarding a patient, converts the signal into a digital signal, and links the digital signal to external equipment.

2. Description of the Related Art

Computed radiography (CR) conventionally scans X-ray of X-ray equipments on an imaging plate (IP) in stead of a film, inserts the IP into CR equipment, scans a laser beam, and acquires an image signal from latent images accumulated in the IP.

Conventional X-ray images are acquired by scanning X-ray to a film and developing the film. Such conventional methods of acquiring X-ray images additionally need films, developing solutions, developers, places for storing a large amount of films, etc. and require re-capturing of X-ray images when the X-ray images are improperly captured.

Further, since a pickup image is viewed by capturing the pickup image in a film and developing the film, a doctor cannot immediately view an X-ray result and must undergo an additional developing process to view an X-ray image.

Meanwhile, Korean Laid-Open Patent No. 2008-0026338 discloses an optical source of optical coherence tomography, and U.S. Pat. No. 7,397,059 discloses a radiation image reading system as the conventional arts.

SUMMARY OF THE INVENTION

The present invention provides an apparatus for acquiring a digital X-ray image that radiates X-ray on a patient's part by using a high sensitivity imaging plate (IP), reads the radiated patient's part, acquires a signal including patient information and image information regarding a patient, converts the signal into a digital signal, and links the digital signal to external equipment.

The present invention also provides an apparatus for acquiring a digital X-ray image that makes it possible to always view an image in an optimal state by adjusting brightness and luminance of the image in various ways using provided software.

The present invention also provides an apparatus for acquiring a digital X-ray image that is easy for carrying in a cassette way.

The present invention also provides an apparatus for acquiring a digital X-ray image that can secure sufficient time to make laser staying on an IP.

According to an aspect of the present invention, there is provided an apparatus for acquiring a digital X-ray image that inserts an imaging plate (IP) into the entrance of a case body, scans a laser beam onto the IP, and acquires an image signal from latent images accumulated by scanning radiation onto the IP 2, the apparatus including: a laser beam scanning unit guiding the laser beam generated from laser; a reflection mirror installed in the entrance of the case body and having the laser beam scanned by the laser beam scanning unit reflected onto the IP without emitting the laser beam to the outside; a dichroic filter transmitting through the laser beam reflected by the reflection mirror to be scanned on the IP and reflecting a blue wavelength light having photostimulated luminescence on the IP by the scanning of the laser beam; an optical fiber transferring the blue wavelength light having photostimulated luminescence on the IP to a band-pass filter; a band-pass filter transmitting the blue wavelength light therethrough and preventing a red wavelength light from transmitting therethrough in order to acquire the blue wavelength light transferred through the optical fiber; a photomultiplication tube acquiring and collecting blue wavelength image signals transmitting through the band-pass filter and amplifying images; two position detection sensors installed at both ends of the entrance of the case body and detecting positions where the laser beam is scanned; a transfer member installed inside the case body, having the IP hooked thereto, and transferring the IP forward and backward; a power transmission unit transmitting power to allow the transfer member to operate; and a controller controlling the operations of the laser, the laser beam scanning unit, the position detection sensors, and the power transmission unit.

The laser beam scanning unit may include: a swing mirror swing left and right according to power applied from the outside and scanning the laser beam generated from the laser; a F-theta lens adjusting a focal distance of the laser beam deflected in the swing mirror; and an auxiliary mirror reflecting the laser beam which has passed through the F-theta lens to a scanning region.

The swing mirror may include: a flow plate having a mirror fixed to the front surface of the flow plate; two magnets installed at both sides of the rear surface of the flow plate; a fixing plate installed to face the flow plate by a predetermined space and having two coils installed in the positions corresponding to the magnets; and two springs each connected to two connection rods that protrude from both sides of the flow plate and the fixing plate.

The dichroic filter may be installed to have an inclination angle of 45 degrees with respect to light that is input into the optical fiber.

The transfer member may include: a rail installed on the bottom of the inner portion of the case body in a horizontal direction; a transfer rod movably installed in the rail and having both ends fixed to a belt of the power transmission unit; and two hooks installed in one side of the transfer rod to have the IP hooked thereto.

The power transmission unit may include: a driving pulley fixed to the driving axis of a motor; a following pulley connected to the driving pulley via a first belt and rotating and connected to two roller shafts; the roller shafts installed in both sides of the inner portion of the case body and connected to the following pulley and first and second pulleys; and two second belts wound around the first and second pulleys of the roller shaft and transferring a rotational force.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

Figure 1:
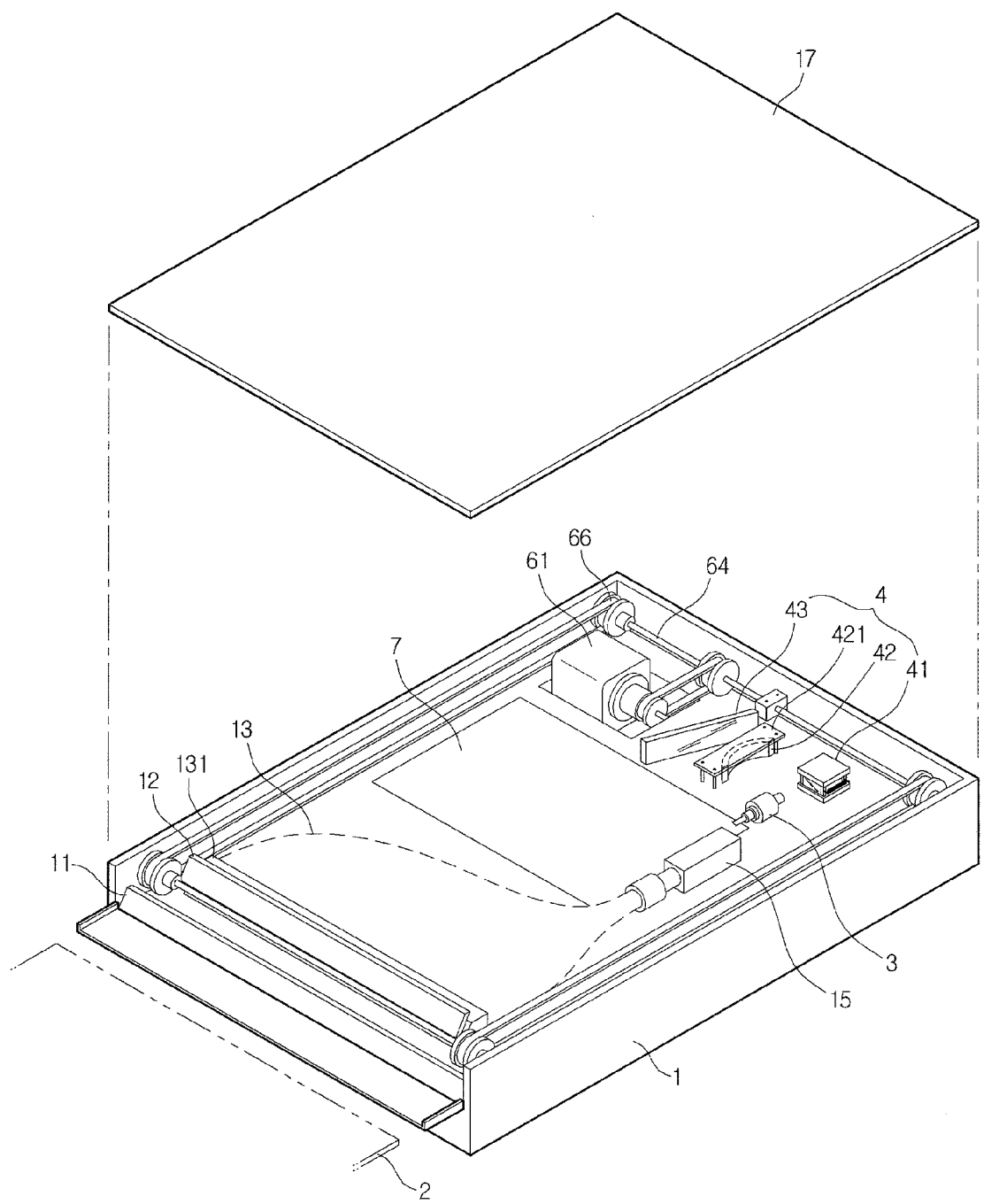
FIG. 1 is a schematic perspective view of an apparatus for acquiring a digital X-ray image according to an embodiment of the present invention.
Figure 2:
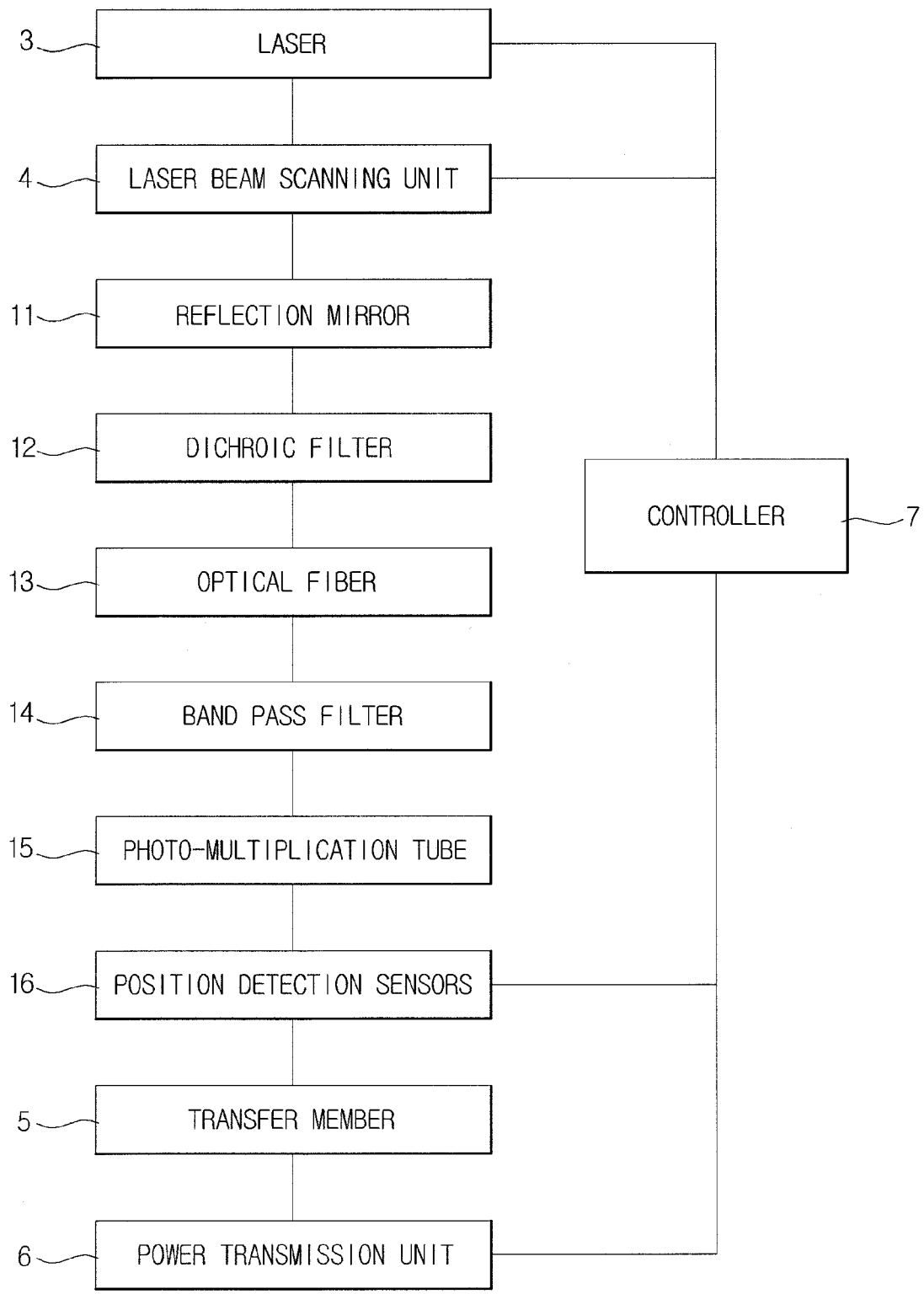
FIG. 2 is a block view of the apparatus for acquiring the digital X-ray image according to an embodiment of the present invention.
Figure 3:
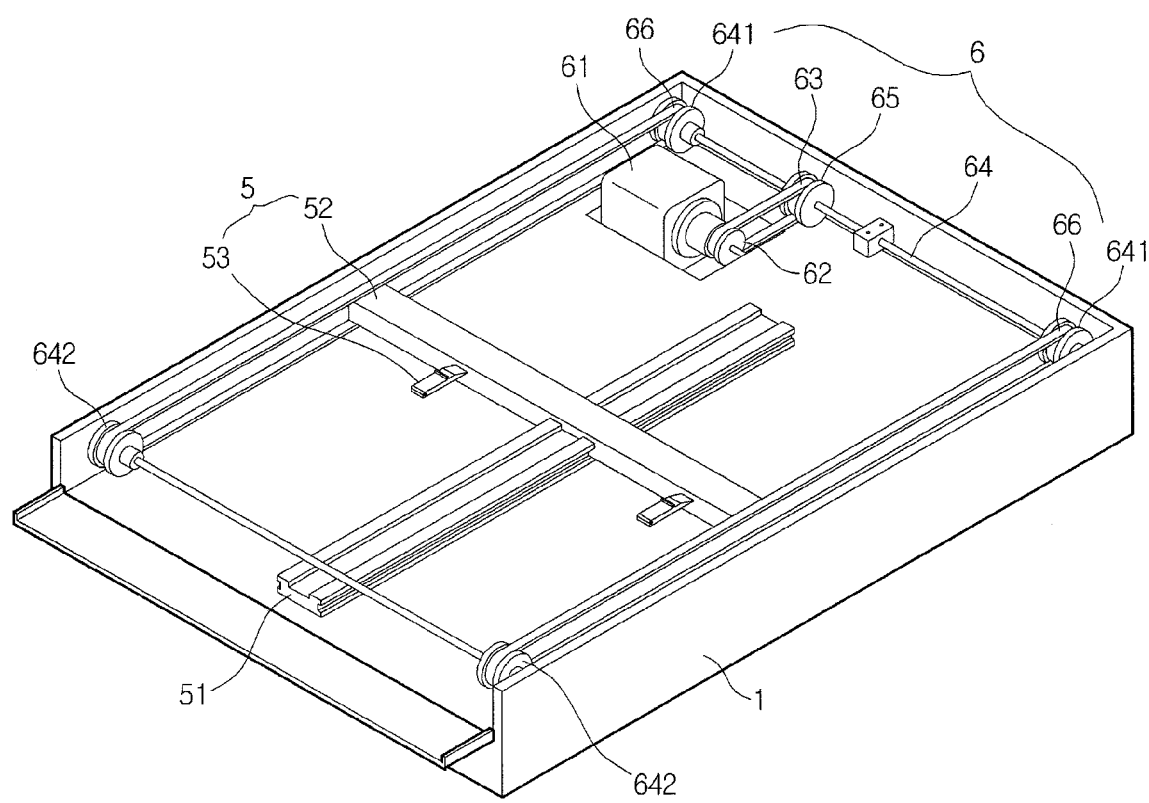
FIG. 3 is a perspective view of a transfer member and a power transmission unit of the apparatus for acquiring the digital X-ray image according to an embodiment of the present invention.
Figure 4:
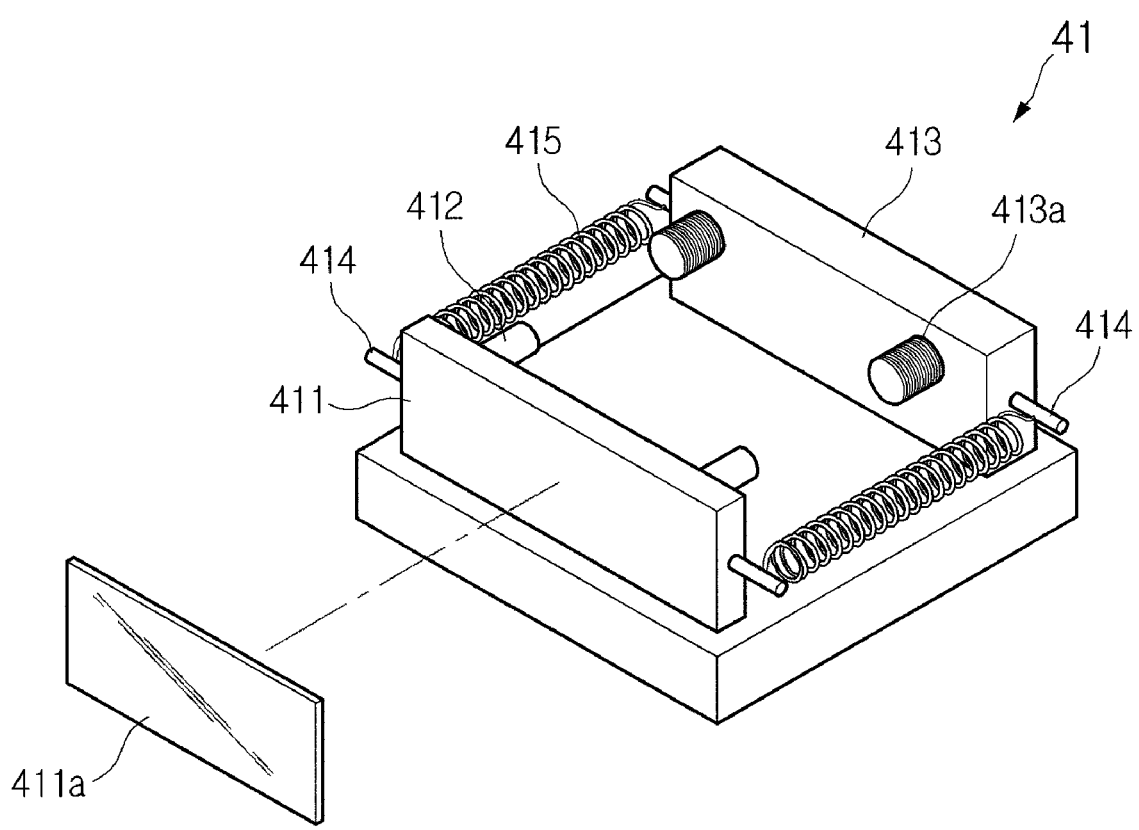
FIG. 4 is a perspective view of a swing mirror of the apparatus for acquiring the digital X-ray image according to an embodiment of the present invention.
Figure 5A:
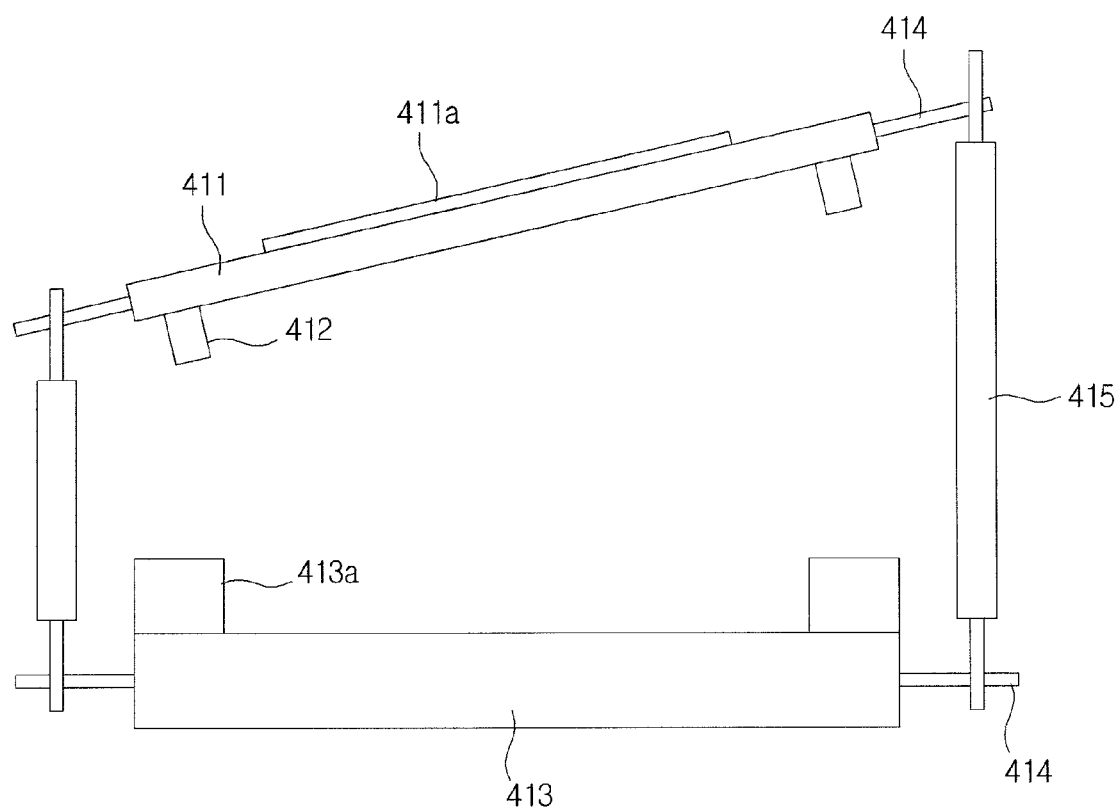
FIGS. 5A and 5B are plan views of the swing mirror shown in FIG. 4 in an operation state according to an embodiment of the present invention.
Figure 5B:
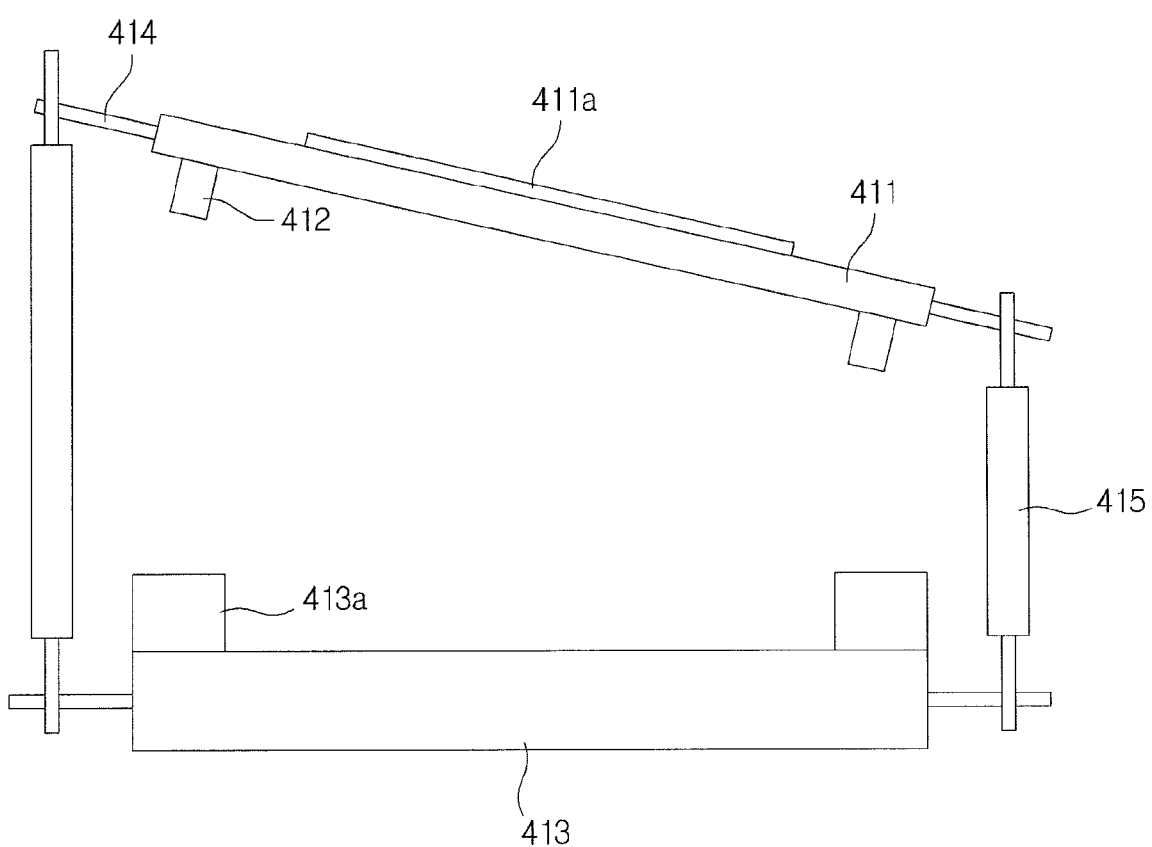
Figure 6:
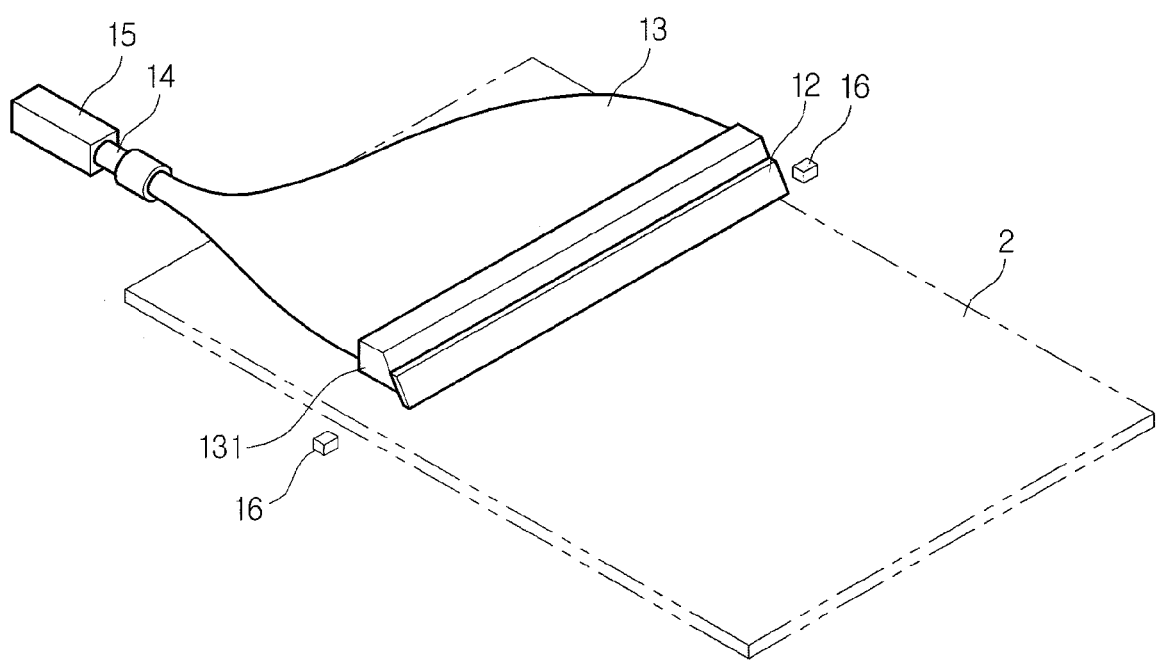
FIG. 6 is a view of a main part of the apparatus for acquiring the digital X-ray image according to an embodiment of the present invention.
Figure 7:
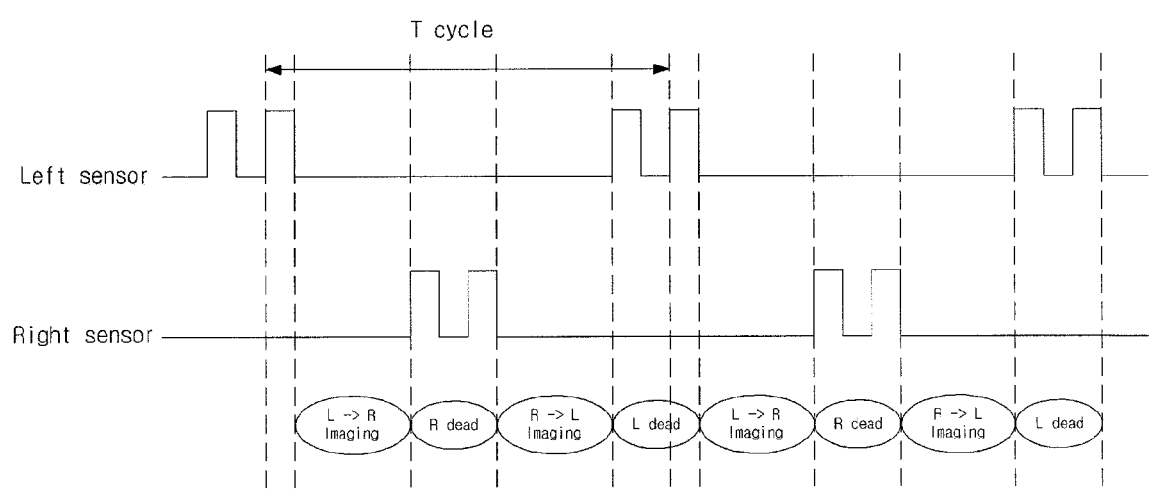
FIG. 7 is a timing diagram of an output signal of two position detection sensors according to an embodiment of the present invention.

FIG. 1 is a schematic perspective view of an apparatus for acquiring a digital X-ray image according to an embodiment of the present invention. FIG. 2 is a block view of the apparatus for acquiring the digital X-ray image according to an embodiment of the present invention. FIG. 3 is a perspective view of a transfer member 5 and a power transmission unit 6 of the apparatus for acquiring the digital X-ray image according to an embodiment of the present invention. FIG. 4 is a perspective view of a swing mirror 41 of the apparatus for acquiring the digital X-ray image according to an embodiment of the present invention. FIGS. 5A and 5B are plan views of the swing mirror 41 shown in FIG. 4 in an operation state according to an embodiment of the present invention. FIG. 6 is a view of a main part of the apparatus for acquiring the digital X-ray image according to an embodiment of the present invention. FIG. 7 is a timing diagram of an output signal of two position detection sensors 16 according to an embodiment of the present invention.

Referring to FIGS. 1 through 3, the apparatus for acquiring the digital X-ray image of the present embodiment, which inserts an imaging plate (IP) 2 into an entrance of a case body 1, scans a laser beam on the IP 2, and acquires an image signal from latent images accumulated by scanning radiation to the IP 2, includes a laser beam scanning unit 4, a reflection mirror 11, a dichroic filter 12, an optical fiber 13, a band pass filter 14, a photo-multiplication tube 15, the position detection sensors 16, the transfer member 5, the power transmission unit 6, and a controller 7.

The apparatus for acquiring the digital X-ray image of the present embodiment is in a cassette way, and is easy for carrying, and thus it is convenient to install the apparatus at any places.

With regard to the characteristics of the IP 2, if the IP 2 is X-ray radiated, a latent image having energy which is in proportion to an X-ray scanning amount exists on the IP 2. If the IP 2 is scanned with a red wavelength laser, the latent image generated by the X-ray radiation is expressed in a blue wavelength. After an image is acquired by scanning the IP 2 with the red laser, the latent image remaining after the IP2 is scanned is removed in order to reuse the IP 2. Therefore, if the IP 2 is exposed to a strong light, the remaining latent image is removed.

The elements of the apparatus for acquiring the digital X-ray image of the present embodiment are mounted inside the case body 1 in which a cover 17 can be opened and closed and is installed in the upper portion of the case body 1, the transfer member 5 for transferring the IP 2 is installed, and the power transmission unit 6 for transmitting power to allow the transfer member 5 to operate is installed.

The transfer member 5 includes a rail 51 that is installed on the bottom of the inner portion of the case body 1 in a horizontal direction, a transfer rod 52 that is movably installed in the rail 51 and has both ends fixed to a belt of the power transmission unit 6, and two hooks 53 that are installed in one side of the transfer rod 52 to have the IP 2 hooked thereto.

In particular, a protection cover (not shown) for protecting the transfer member 5 from the above elements installed inside the case body 1 is formed in the upper portion of the transfer member 5.

The power transmission unit 6 includes a driving pulley 62 that is fixed to the driving axis of a motor 61, a following pulley 65 that is connected to the driving pulley 62 via a first belt 63 and rotates and is connected to two roller shafts 64, the roller shafts 64 that are installed in both sides of the inner portion of the case body 1 and are connected to the following pulley 65 and first and second pulleys 641 and 642, and two second belts 66 that are wound around the first and second pulleys 641 and 642 of the roller shaft 64 and transfer a rotational force.

In more detail, when the motor 61 of the power transmission unit 6 operates according to a control signal of the controller 7, the roller shafts 64 rotate in association with the operation of the motor 61, the second belts 66 that are wound around the first and second pulleys 641 and 642 of the roller shaft 64 rotate, and the transfer rod 52 fixed to the second belts 66 is transferred. The IP 2 that is hooked on the hook 53 is transferred along with the transfer of the transfer rod 52.

Meanwhile, the laser beam scanning unit 4 guides a laser beam generated from laser 3.

The laser beam scanning unit 4 includes the swing mirror 41 that swings left and right according to power applied from the outside, and scans the laser beam generated from the laser 3, a F-theta lens 42 that adjusts a focal distance of the laser beam deflected in the swing mirror 41, and an auxiliary mirror 43 that reflects the laser beam which has passed through the F-theta lens 42 to a scanning region.

Referring to FIGS. 4 and 5, the swing mirror 411 includes a flow plate 411 having a mirror 411a fixed to the front surface of the flow plate 411, two magnets 412 installed at both sides of the rear surface of the flow plate 411, a fixing plate 413 installed to face the flow plate 411 by a predetermined space and having two coils 413a installed in the positions corresponding to the magnets 412, and two springs 415 each connected to two connection rods 414 that protrude from both sides of the flow plate 411 and the fixing plate 413.

In more detail, if power is applied to the left coil 413a, a magnetic force is generated in the left coil 413a, the magnet 412 installed in the position corresponding to the left coil 413a moves according to the magnetic force simultaneously with the contraction of the left spring 415, and thus the flow plate 411 connected to the left spring 415 swings left.

To the contrary, if power is applied to the right coil 413a, the right magnet 412 and the right spring 415 operate and thus the flow plate 411 swings right.

Two line scanning may be performed at a single swing of the swing mirror 41. Adjustment of a swing width prevents laser from scanning an unnecessary region, which may increase a duty ratio (a ratio between a selection time applied to an electrode pattern and time, i.e., a cycle, for scanning all electrode patterns one time by a selection waveform) obtained by scanning the IP 2 with laser. The increase of the duty ratio can achieve a sufficient time for making laser staying on the IP2, which increases a swing speed of the swing mirror 41 and reduces scanning time of the IP2.

The F-theta lens 42 is in a semi-circular shape. A plane plate 421 is formed on the upper portion of the F-theta lens 42, a plurality of screws are used to lock the F-theta lens 42 into the plane plate 421, the F-theta lens 42 is fixed to the bottom of the case body 1, and thus the F-theta lens 42 does not move.

The auxiliary mirror 43, which is a general mirror, is installed near the F-theta lens 42 so as to reflect laser beam passing through the F-theta lens 42 onto a scan region, and changes an installation direction in view of a reflection region of the laser beam.

The reflection mirror 11 is installed in the entrance of the case body 1 and has the laser beam scanned by the laser beam scanning unit 4 reflected onto the IP 2 without emitting the laser beam to the outside. In particular, the reflection mirror 11 is installed to have an inclination angle of 45 degrees.

Referring to FIG. 6, the dichroic filter 12 transmits through the laser beam reflected by the reflection mirror 11 to be scanned on the IP 2 and reflects a blue wavelength light having photostimulated luminescence on the IP 2 by the scanning of the laser beam.

The dichroic filter 12 is fixed to the outer surface of a fixing plate 131 that fixes an optical fiber 13 which is a bundle of fibers, and is installed to have an inclination angle of 45 degrees with respect to light that is input into the optical fiber 13.

The dichroic filter 12 allows a red wavelength light for scanning the IP 2 to reach the IP 2 by transmitting the red wavelength light therethrough, and transfer a blue wavelength light expressed in the IP 2 to the photo-multiplication tube 15 by reflecting the blue wavelength light.

The dichroic filter 12 can produce a substitution effect of the band-pass filter 14 by itself, and can increase an effect of preventing the red wavelength light from being transferred to the photo-multiplication tube 15 when the dichroic filter 12 is used with the band-pass filter 14.

The optical fiber 13 transfers the blue wavelength light having photostimulated luminescence on the IP 2 to the band-pass filter 14.

The optical fiber 13, which is a bundle of fibers, has one side that is uniformly unfolded by the width of the IP 2 and is fixed to the fixing plate 131, and another side that is fixed as a bunch and is inserted into the photo-multiplication tube 15.

The band-pass filter 14 is installed between the optical fiber 13 and the photo-multiplication tube 15, transmits the blue wavelength light therethrough and prevents the red wavelength light from transmitting therethrough in order to acquire the blue wavelength light transferred only through the optical fiber 13.

In more detail, in order to acquire accurate image information, the photo-multiplication tube 15 must selectively acquire the blue wavelength light that is image information expressed by separating the red wavelength light used to scan the IP 2 and the blue wavelength light expressed on the IP 2. Therefore, the band-pass filter 14 separates wavelengths.

The photo-multiplication tube 15 acquires and collects blue wavelength image signals transmitting through the band-pass filter 14 and amplifies images.

Meanwhile, the position detection sensors 16 are installed at both ends of the entrance of the case body 1 and detect positions where the laser beam is scanned.

In more detail, when laser swung by the swing mirror 41 is detected by the left position detection sensor 16, it is recognized as a start of scanning, and when the laser is detected by the right position detection sensor 16, it is recognized as an end of scanning. Thus, one line scanning is complete, subsequent line scanning starts right, when the laser is detected by the right position detection sensor 16, it is recognized as a start of scanning, and when the laser is detected by the left position detection sensor 16, it is recognized as an end of scanning.

When the laser beam is fully swung, a signal is detected by two sensors as shown in FIG. 7.

Referring to FIG. 7, T cycle is a cycle by which an image is obtained by a single mirror swing, L→R imaging indicates acquisition of an image signal when laser beam moves from left to right by a half swing of a mirror, R→L imaging indicates acquisition of an image signal when laser beam moves from right to left by a half swing of a mirror, R dead indicates dead time between an end of L→R imaging and a start of R→L imaging by using a right detection sensor, and L dead indicates dead time between an end of R→L imaging and a start of L→R imaging by using a left detection sensor.

A rising edge and a falling edge of a sensor are precisely measured by hardware logic in view of a high speed time. The measurement result is added to the end of corresponding image data and is transmitted to a PC. That is, an image for which scanning is complete may provide information about laser beam at the time of obtaining an image of a corresponding line at the end of each line along with the image.

Software performed in the PC receives the image information, calculates a start point and an end point of a physical image by utilizing the measurement information of the laser beam disposed at the end of a corresponding line, and adjusts inner image information to an actual physical position.

The controller 7 controls the operation of the laser 3, the laser beam scanning unit 4, the position detection sensors 16, and the power transfer unit 6.

The controller 7 controls the general operation of the apparatus for acquiring the digital X-ray image and transmits acquired image information to the PC.

If data processing is performed with regard to an image signal by using an A/D converter (not shown) for converting an analog image signal which is amplified by the photo-multiplication tube 15 into a digital signal, the image signal is connected to an output port of the controller 7 to display image data on the PC and a monitor.

Hereinafter, the relationships between the operations of the apparatus for acquiring the digital X-ray image will now be described.

When the laser 3 operates under the control of the controller 7, laser beam generated by the laser 3 is radiated onto the swing mirror 41. The swing mirror 41 which receives the laser beam swings fast left and right, the scanned laser beam is focused through the F-theta lens 42, and is scanned to an entrance side of the IP 2 that is a scanning region by the reflection of the auxiliary mirror 43 through the F-theta lens 42.

The transfer member 5 that receives power of the power transfer unit 6 operates and thus the IP 2 is transferred to the scanning region.

The laser beam scanned to the entrance side of the IP 2 is transmitted through the dichroic filter 12 which is inclined by 45 degrees, and is sent to the optical fiber 13 by reflecting the blue wavelength light of the IP 2.

In addition to the blue wavelength light, an undesired red wavelength light is transferred through the optical fiber 13, and is prevented from transmitting through the band-pass filter 14.

As described above, image scanning of the IP 2 is complete. Meanwhile, when a laser beam swung by the swing mirror 41 is detected by a left sensor, it is recognized as a start of the image scanning, and when the laser beam is detected by a right sensor, it is recognized as an end of the image scanning. Both direction scanning of the IP 2 is continued by the two sensors and thus the IP 2 is entirely scanned.

Figure 8:
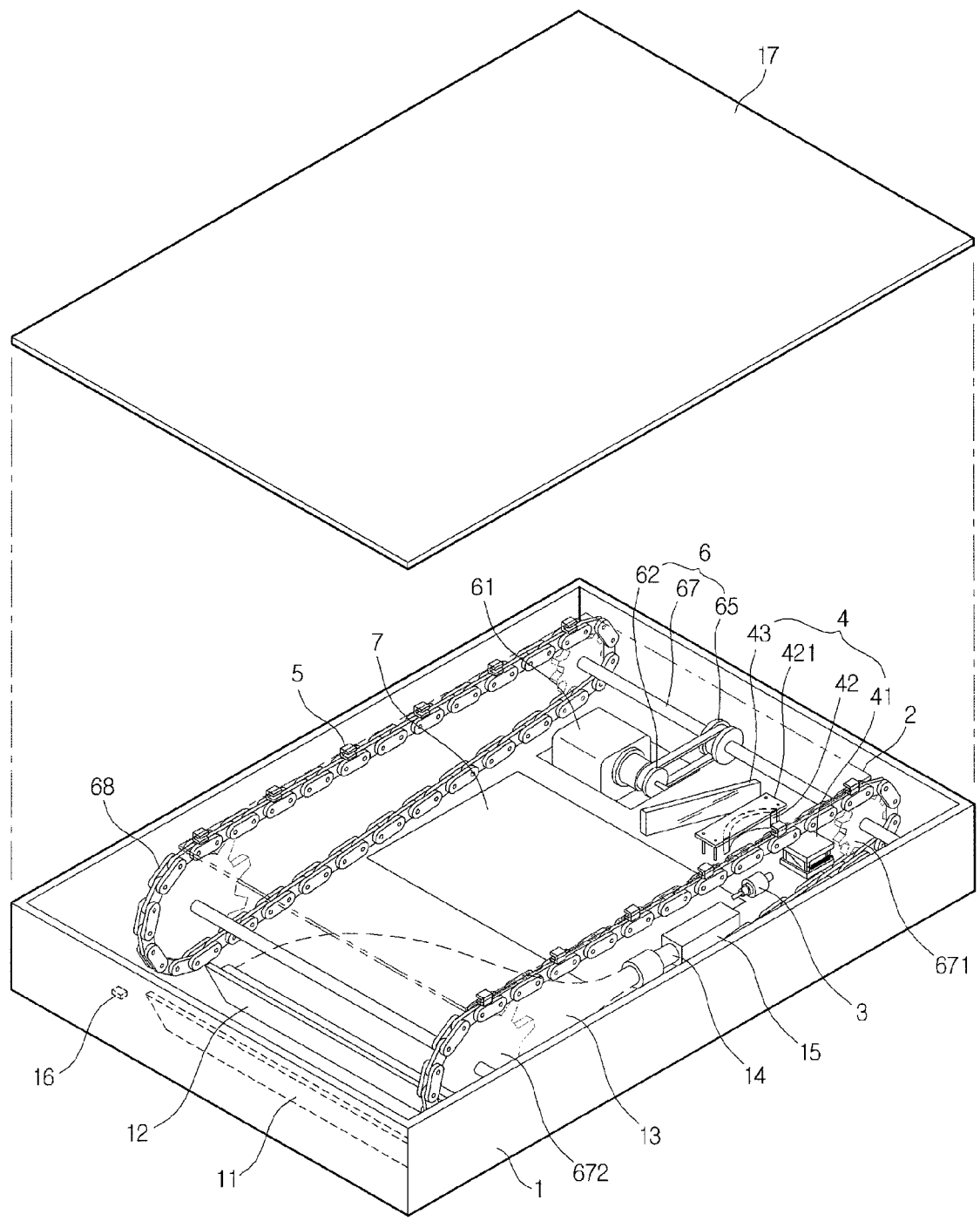
FIG. 8 is a schematic perspective view of an apparatus for acquiring a digital X-ray image according to another embodiment of the present invention.

Meanwhile, FIG. 8 is a schematic perspective view of an apparatus for acquiring a digital X-ray image according to another embodiment of the present invention. Referring to FIG. 8, in the apparatus for acquiring the digital X-ray image of the present embodiment, the case body 1 includes the IP 2.

The apparatus for acquiring the digital X-ray image that scans a laser beam onto the IP 2 included in the case body 1 and acquires an image signal from latent images accumulated by scanning radiation onto the IP 2 includes a laser beam scanning unit 4 guiding the laser beam generated from laser 3, a reflection mirror 11 installed in one side of the interior of the case body 1 and having the laser beam scanned by the laser beam scanning unit 4 reflected onto the IP 2 without emitting the laser beam to the outside, a dichroic filter 12 transmitting through the laser beam reflected by the reflection mirror to be scanned on the IP 2 and reflecting a blue wavelength light having photostimulated luminescence on the IP 2 by the scanning of the laser beam, an optical fiber 13 transferring the blue wavelength light having photostimulated luminescence on the IP 2 to a band-pass filter, a band-pass filter 14 transmitting the blue wavelength light therethrough and preventing a red wavelength light from transmitting therethrough in order to acquire the blue wavelength light transferred through the optical fiber 13, a photo-multiplication tube 15 acquiring and collecting blue wavelength image signals transmitting through the band-pass filter 14 and amplifying images, two position detection sensors 16 installed at both ends of one side of the interior of the case body 1 and detecting positions where the laser beam is scanned, a plurality of transfer members 5 installed inside the case body 1 and reciprocally transferring the IP 2 forward and backward, a power transmission unit 6 transmitting power to allow the transfer members 5 to operate, and a controller 7 controlling the operations of the laser 3, the laser beam scanning unit 4, the position detection sensors 16, and the power transmission unit 6.

The elements of the apparatus for acquiring the digital X-ray image of the present embodiment that includes the IP 2 have the same construction as those of the apparatus for acquiring the digital X-ray image of the previous embodiment, except for the arrangement of the IP 2, the transfer members 5, and the power transmission unit 6.

The transfer members 5 are fixed in a length direction of a chain 68 of the power transmission unit 6 and are rectangular-shaped and are bent in the shape of " "ㄷ" " from both ends thereof in order to guide transfer of the IP 2.

The power transmission unit 6 includes a driving pulley 62 that is fixed to the driving axis of a motor 61, a following pulley 65 that is connected to the driving pulley 62 via a belt and rotates and is connected to a plurality of chain shafts 67 installed inside the case body 1, first and second sprockets 671 and 672 installed in both ends of the chain shafts 67, respectively, and the chain 68 fastened to the first and second sprockets 671 and 672.

A diameter of the first sprocket 671 is smaller than that of the second sprocket 672 so that the first sprocket 671 is not limited to a space where the laser beam scanning unit 4 is installed.

An apparatus for acquiring a digital X-ray image according to the present invention acquires a digitalized X-ray image by using a reusable IP, which does not need a film, a developing solution, and a developer which are consumables, and stores the digitalized X-ray image on a storage medium, such as a hard disc or a CD, which does not need a huge scale of a storage space as needed for use of the film.

Also, the apparatus displays the acquired image on a computer monitor, adjusts brightness and luminance of the displayed image in various ways by provided software, and makes the displayed image to be always viewed in an optimal state, thereby reducing re-radiation due to an improper X-ray radiation.

Also, the apparatus is easy for carrying in a cassette way, which can be easily installed and carried irrespective of a place.

Also, the apparatus can secure sufficient time to make laser stay on an IP, which increases a swing speed of a swing mirror and reduces a time for wholly scanning the IP.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for acquiring a digital X-ray image that inserts an imaging plate (IP) into the entrance of a case body, scans a laser beam onto the IP, and acquires an image signal from latent images accumulated by scanning radiation onto the IP, the apparatus comprising:

a laser beam scanning unit guiding the laser beam generated from laser;

a reflection mirror installed in the entrance of the case body and having the laser beam scanned by the laser beam scanning unit reflected onto the IP without emitting the laser beam to the outside;

a dichroic filter transmitting through the laser beam reflected by the reflection mirror to be scanned on the IP and reflecting a blue wavelength light having photostimulated luminescence on the IP by the scanning of the laser beam;

an optical fiber transferring the blue wavelength light having photostimulated luminescence on the IP to a band-pass filter;

a band-pass filter transmitting the blue wavelength light therethrough and preventing a red wavelength light from transmitting therethrough in order to acquire the blue wavelength light transferred through the optical fiber;

a photo-multiplication tube acquiring and collecting blue wavelength image signals transmitting through the band-pass filter and amplifying images;

two position detection sensors installed at both ends of the entrance of the case body and detecting positions where the laser beam is scanned;

a transfer member installed inside the case body, having the IP hooked thereto, and transferring the IP forward and backward;

a power transmission unit transmitting power to allow the transfer member to operate; and a controller controlling the operations of the laser, the laser beam scanning unit, the position detection sensors, and the power transmission unit.

2. An apparatus for acquiring a digital X-ray image that scans a laser beam onto an IP included in the case body and acquires an image signal from latent images accumulated by scanning radiation onto the IP, the apparatus comprising:
- a laser beam scanning unit guiding the laser beam generated from laser;
- a reflection mirror installed in one side of the interior of the case body and having the laser beam scanned by the laser beam scanning unit reflected onto the IP without emitting the laser beam to the outside;
- a dichroic filter transmitting through the laser beam reflected by the reflection mirror to be scanned on the IP and reflecting a blue wavelength light having photostimulated luminescence on the IP by the scanning of the laser beam;
- an optical fiber transferring the blue wavelength light having photostimulated luminescence on the IP to a band-pass filter;
- a band-pass filter transmitting the blue wavelength light therethrough and preventing a red wavelength light from transmitting therethrough in order to acquire the blue wavelength light transferred through the optical fiber;
- a photo-multiplication tube acquiring and collecting blue wavelength image signals transmitting through the band-pass filter and amplifying images;
- two position detection sensors installed at both ends of one side of the interior of the case body and detecting positions where the laser beam is scanned;
- a plurality of transfer members installed inside the case body and reciprocally transferring the IP forward and backward;
- a power transmission unit transmitting power to allow the transfer members to operate; and
- a controller controlling the operations of the laser, the laser beam scanning unit, the position detection sensors, and the power transmission unit.

3. The apparatus of claim 1, wherein the laser beam scanning unit comprises:
- a swing mirror swing left and right according to power applied from the outside and scanning the laser beam generated from the laser;
- a F-theta lens adjusting a focal distance of the laser beam deflected in the swing mirror; and
- an auxiliary mirror reflecting the laser beam which has passed through the F-theta lens to a scanning region.

4. The apparatus of claim 3, wherein the swing mirror comprises:
- a flow plate having a mirror fixed to the front surface of the flow plate;
- two magnets installed at both sides of the rear surface of the flow plate;
- a fixing plate installed to face the flow plate by a predetermined space and having two coils installed in the positions corresponding to the magnets; and
- two springs each connected to two connection rods that protrude from both sides of the flow plate and the fixing plate.

5. The apparatus of claim 1, wherein the dichroic filter is installed to have an inclination angle of 45 degrees with respect to light that is input into the optical fiber.

6. The apparatus of claim 1, wherein the transfer member comprises:
- a rail installed on the bottom of the inner portion of the case body in a horizontal direction;
- a transfer rod movably installed in the rail and having both ends fixed to a belt of the power transmission unit; and
- two hooks installed in one side of the transfer rod to have the IP hooked thereto.

7. The apparatus of claim 2, wherein the transfer members are fixed in a length direction of a chain of the power transmission unit and are rectangular-shaped and are bent in the shape of "⊏" from both ends thereof in order to guide transfer of the IP.

8. The apparatus of claim 1, wherein the power transmission unit comprises:
- a driving pulley fixed to the driving axis of a motor;
- a following pulley connected to the driving pulley via a first belt and rotating and connected to two roller shafts;
- the roller shafts installed in both sides of the inner portion of the case body and connected to the following pulley and first and second pulleys; and
- two second belts wound around the first and second pulleys of the roller shaft and transferring a rotational force.

9. The apparatus of claim 2, wherein the power transmission unit comprises:
- a driving pulley fixed to the driving axis of a motor;
- a following pulley connected to the driving pulley via a belt and rotating and connected to a plurality of chain shafts installed inside the case body;
- first and second sprockets installed in both ends of the chain shafts, respectively; and
- the chain fastened to the first and second sprockets.

10. The apparatus of claim 2, wherein the laser beam scanning unit comprises:
- a swing mirror swing left and right according to power applied from the outside and scanning the laser beam generated from the laser;
- a F-theta lens adjusting a focal distance of the laser beam deflected in the swing mirror; and
- an auxiliary mirror reflecting the laser beam which has passed through the F-theta lens to a scanning region.

11. The apparatus of claim 2, wherein the dichroic filter is installed to have an inclination angle of 45 degrees with respect to light that is input into the optical fiber.

* * * * *